July 11, 1939.  E. KRIMSKY  2,166,063
PHOROMETRIC STEREOSCOPE
Filed May 27, 1937  3 Sheets-Sheet 1

INVENTOR
Emanuel Krimsky.
BY Raymond Jones.
ATTORNEY

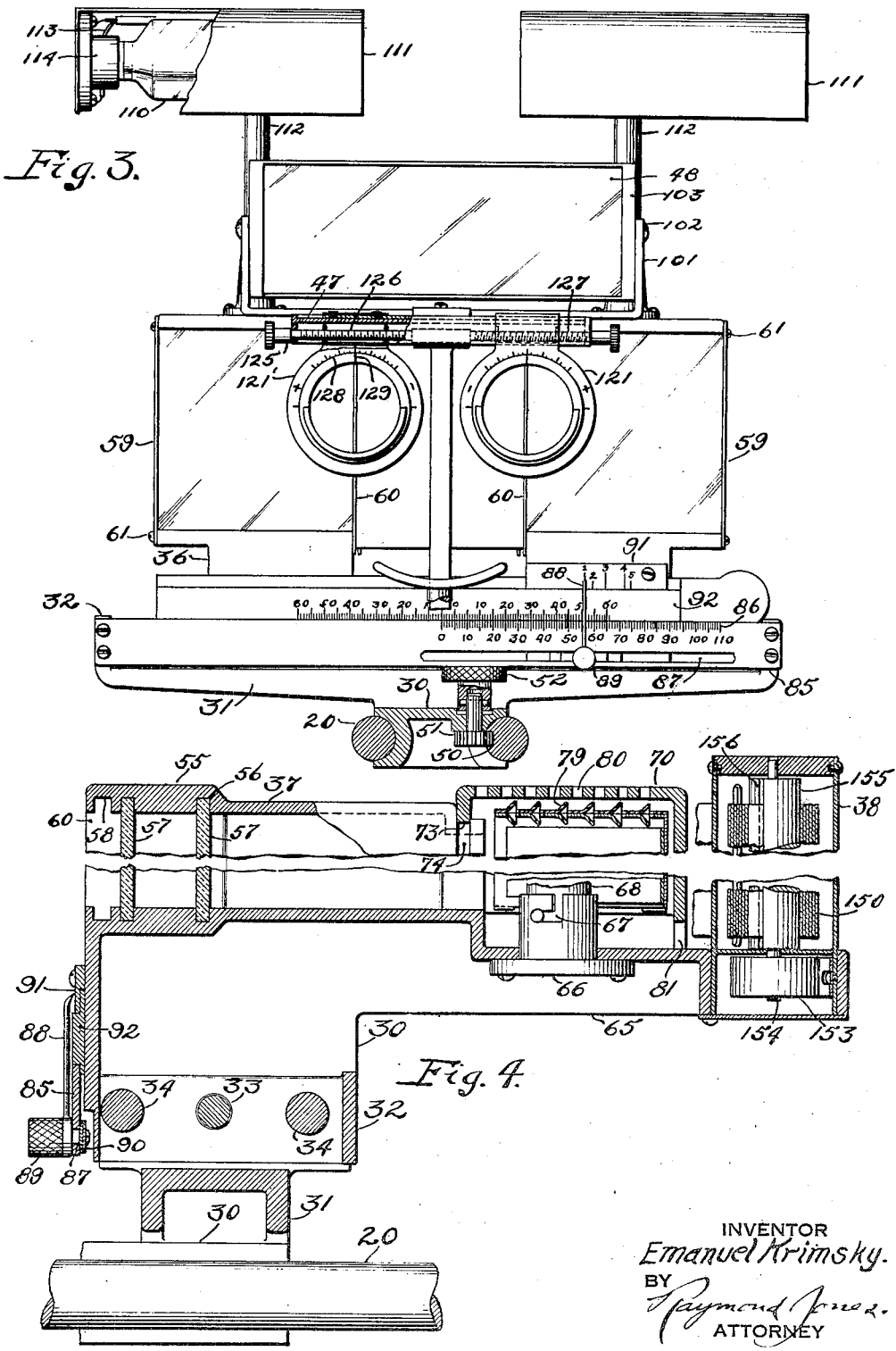
July 11, 1939. E. KRIMSKY 2,166,063
PHOROMETRIC STEREOSCOPE
Filed May 27, 1937 3 Sheets-Sheet 2
INVENTOR
Emanuel Krimsky.
BY
ATTORNEY July 11, 1939.  E. KRIMSKY  2,166,063
PHOROMETRIC STEREOSCOPE
Filed May 27, 1937  3 Sheets-Sheet 3
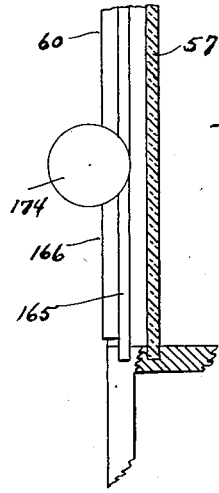
Fig. 12.
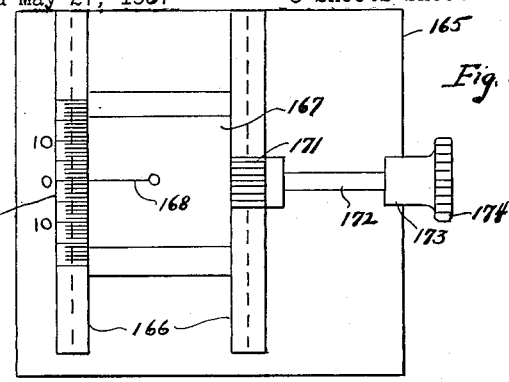
Fig. 6.
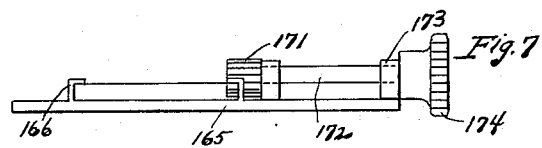
Fig. 7.
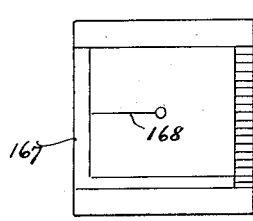
Fig. 8.
Fig. 11.
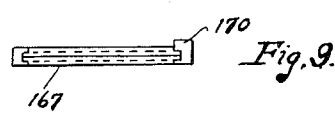
Fig. 9.
Fig. 13.
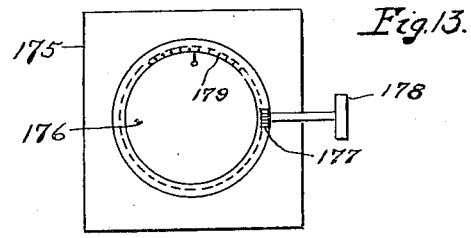
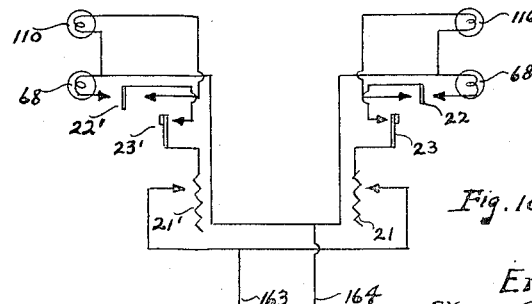
Fig. 10.
INVENTOR
Emanuel Krimsky.
BY Raymond Jones.
ATTORNEY Patented July 11, 1939

2,166,063

UNITED STATES PATENT OFFICE 2,166,063

PHOROMETRIC STEREOSCOPE

Emanuel Krimsky, Brooklyn, N. Y.

Application May 27, 1937, Serial No. 145,125

8 Claims. (Cl. 88—20)

This invention relates to stereoscopes and, more particularly, to a phorometric stereoscope and has for its main object to provide a stereoscope which has a plurality of adjustable elements so arranged as to permit a greater range of precision measurements to be made in eye examination and for the correction of eye muscle defects.

Another object is to provide a pair of viewing boxes that are illuminated in a novel manner and arranged to receive either transparent, translucent, colored or solid objects to be viewed.

Another object is to provide a novel arrangement of illumination both in front and in rear of the object to be viewed and a selective control of illumination as desired.

Another object is to provide a novel means to adjustably support a stereocampimeter upon a stereoscope.

Another object is to provide a mirror so positioned and illuminated as to permit the operator to readily observe the eyes of the patient.

A further object is to provide a series of adapters having means for adjustably retaining an object to be viewed.

Other objects will be understood in the specification which follows and the accompanying drawings, wherein—

Fig. 3 is a front view showing parts in section and parts broken away.

Fig. 4 is a view in cross section on line 4—4 of Fig. 2.

Fig. 6 is a detail view of an adapter.

Fig. 7 is an end view of an adapter.

Fig. 8 shows a slide arranged to engage the adapter shown in Fig. 6.

Fig. 9 is an end view of a slide.

Fig. 10 shows the wiring diagram for the various lamps and switches.

Fig. 11 shows, in detail, a spring clamp for a wedge prism;

Fig. 12 shows, in conventional form and side view, an adapter mounted in position on the front of a viewing box; and Fig. 13 shows a rotary adapter.

Figure 2:
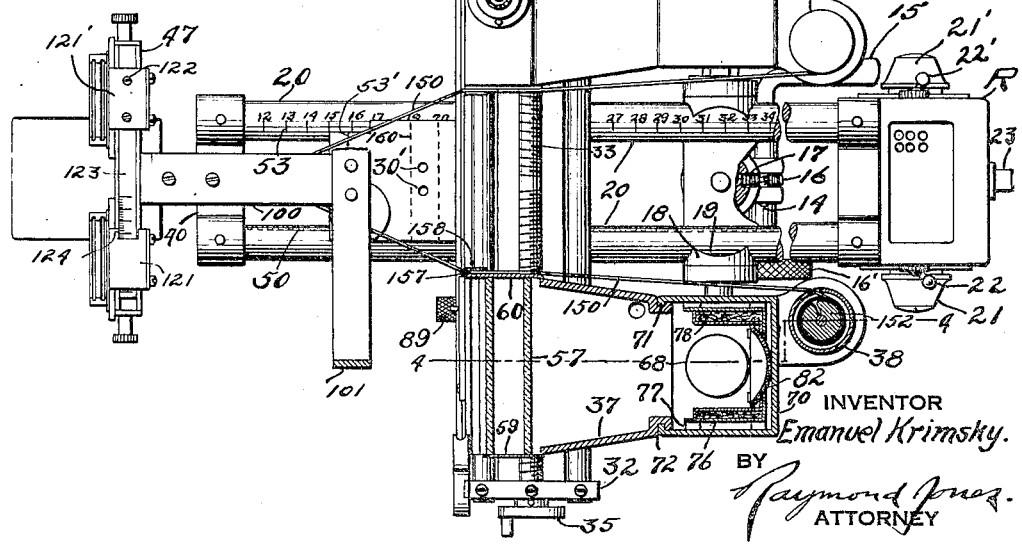
Fig. 2 is a plan view showing parts in section.

Referring to the drawings in detail, a base 10 is provided with an upright post 11 adapted to slidably receive a stem 12 having a forked bracket 13 at the upper end thereof. The post, at its upper end, is split and suitably flanged to receive a clamp bolt 14 provided with a handle 15. Disposed between the said flanges is a gear 16 secured to a thumb wheel 16' as shown in Fig. 2. The stem 12 is provided with a toothed rack 17 adapted for engagement by the gear 16, whereby vertical adjustment of the head of the mechanism is obtained.

Figure 1:
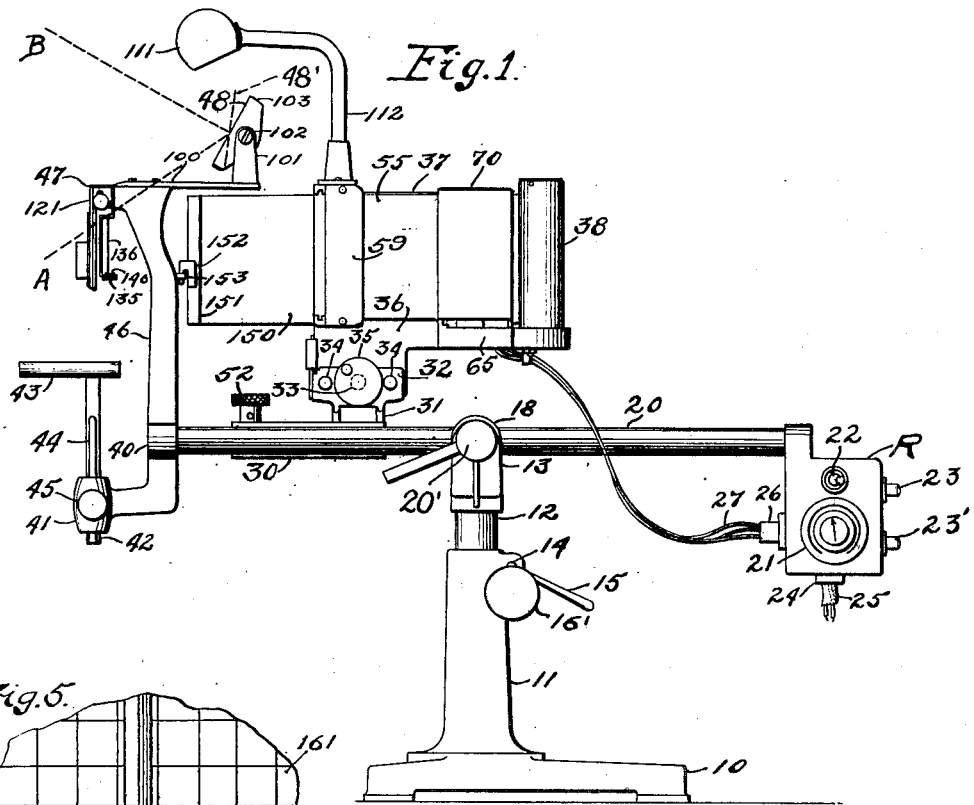
Figure 1 is a side elevational view of my improved stereoscope.

Pivotally mounted to the upper end of each of the legs of the bracket 13, and on the inside thereof, is a slide supporting disc 18 provided with arcuate transverse grooves 19 adapted to partially embrace the longitudinal slide rods 20 and a clamp bolt 20' shown in Fig. 1 is provided in bracket 13 to clamp discs 18 against the rods 20. A receptable R is mounted on the rear ends of rods 20 for housing the electrical switches, etc., for control and manipulation of the electrical apparatus associated with the device. These electrical controls comprise rheostats 21 and 21', toggle switches 22 and 22' and main switches 23 and 23' for the electric bulbs to be described later.

Disposed in the bottom of this receptacle R is a bushing 24 through which the supply wires 25 pass. The front of the receptacle R is provided with an outlet bushing 26, from which emerges a plurality of wires 27 providing a flexible connection to the lights, the purpose of which will become apparent.

Slidably arranged between the slide bars 20 is a slide block 30 which carries a cross bracket 31 having an upright flange 32 at each end providing bearings for a lead screw 33. The slide 30 has two holes 30' for holding a stereo-campimetric attachment to be supported therein for use when desired. The flanges also provide supports for transverse slide rods 34 arranged, one on either side of the lead screw. This lead screw is provided with left and right hand threaded portions, and has secured at one end thereof and outside the flanges 32, a hand wheel 35.

Slidably arranged on the cross rods 34 and engaged by respective threaded portions of the lead screw are brackets 36 each adapted to support a light box 37 and a spring roller casing 38 to be described later.

Secured to the longitudinal slide rods at the forward end thereof is a bracket 40 provided with a hub 41, adapted to slidably receive a rod 42 to the upper end of which is fixed a chin rest 43. The rod 42 is provided with a flattened portion 44 adapted to be engaged by a set screw 45 threaded in the hub 41, thereby permitting vertical adjustment of the chin rest and also maintaining the chin rest in longitudinal alinement. The bracket 40 has an upright extension 46, to the extreme upper end of which is secured a lens supporting slide 47 and a mirror 48 to be described later.

One of the longitudinal rods 20, on its inner face thereof, is provided with a rack 50 adapted to be engaged by a gear 51 secured to a thumb screw 52 journalled in the slide and disposed on the upper face of the slide. By this means the longitudinal adjustment or back and forth movement of the light box is obtained and the focus of any visible matter or stereoscopic cards is thereby made variable.

On the other longitudinal rod 20 there is provided a scale 53, preferably in centimeters and millimeters. An index mark 53' is provided on the slide whereby the setting of the focus is indicated.

The light box comprises a casing 55 having a plurality of grooves 56 in the upper and lower internal walls thereof adapted to receive one or more glass plates 57 or the like. These may be transparent, translucent, colored or tinted as desired or solid objects, as well as opaque prints.

The upper and lower portions of the forward end of the viewing head extend forward beyond the marginal edge of the sides and, in these portions and in the inner surface thereof, there is provided a pair of similar grooves 58 adapted to receive in an upright position an opaque or translucent picture or reading indicia to be viewed or a solid object.

Retaining metal plates 59 and 60 are provided to retain the glass plates 57 or other plates of suitable material, such as Cellophane or the like, in place. The plates 60 are of such width as to provide an inner stop for all of the glass plates as well as the picture, but the plates 59 are of such extent as to retain only the glass plates 57 and thereby permit the ready removal of the picture slide. The plates 59 and 60 are preferably secured to the sides of the light box by screws 61 but may form an integral part of the light box. The light box 37 may be cast integrally with the bracket 36 as illustrated, or may be comprised of a separate unit suitably secured to the bracket in any manner.

Secured to an extension 65 of the bracket 36 is a lamp socket 66 having a bayonet slot arrangement 67 adapted to suitably support an electric bulb 68.

Secured to the rear end of the light box is a lamp housing 70 which is provided with inturned portions 71 adapted to be slidably received in vertical grooves or slideways 72 in the light box. This housing 70 is also provided with a downwardly extending lip 73 at its forward end, which is adapted to engage a horizontally disposed groove 74 along the upper face of the light box at the rear thereof.

A heat insulating casing 76 having side, rear, and top walls and open at the front and bottom, is frictionally retained within the lamp housing 70 by means of engagement of outwardly turned projections 77 at the lower ends of the heat casing with side walls of lamp housing as shown in Fig. 2. This provides small contacting areas between these parts whereby a minimum of heat is conducted to the lamp housing. The side walls and rear walls are therefore spaced from the respective adjacent walls of the lamp housing and the side walls may be provided with heat insulation 78. The top wall is provided with louvres 79. The lamp housing is open at the bottom and is spaced from the extension 65 to allow for the entrance of air into the interior of the heat casing which passes through said louvres and also allows air to pass between the heat casing and the surrounding lamp housing. The air assists in cooling this assembly and heated air may pass up through holes 80 in the top of the lamp housing. A downwardly extending tab 81 resting on the extension 65 supports the rear of the lamp housing. A reflector 82 is provided in the rear wall of the heat casing 76.

As will be seen from Figure 2, the light boxes or viewing boxes are laterally movable, i. e., the light boxes 37 can be moved toward and away from each other synchronously with respect to the central plane of the device by rotation of the lead screw 33 in one direction or the other by manipulation of the hand wheel 35.

A scale plate 85 is secured to the cross bracket 31 and has inscribed thereon, and readable from the front of the machine, a fixed millimeter scale 86 having the zero at its left end with the graduations increasing to the right. A slot 87 is provided in this plate 85 and cooperating therewith is a slidable pointer 88 provided with a manually manipulatable knob 89. This pointer is frictionally held to the plate 85 by means of a flat spring 90 disposed at the rear of the plate as shown in Fig. 4.

Secured to the front and lower portion of the right hand slidable bracket 36 is an indexing scale 91. Slidably arranged between the two scales there is preferably provided a millimeter scale 92 having markings thereon readable with respect to the millimeter scale 86 on the plate 85. The scale 92 has a zero point at the center and graduations increasing from both sides of this zero. It will be observed that the pointer 88 is readable with respect to all the three last-mentioned scales.

For supporting the mirror arrangement 48, there is provided a U-shaped brace 100 extending rearwardly from the member 46, the rearward end being secured to a U-shape bracket 101 having pivots 102 engaging the mirror casing 103. By this arrangement the patient's eyes may be observed by the attending physician positioned in rear of the patient as shown in Fig. 1, with the mirror adjusted to a position 48', the image of the patient's eyes at A may be observed at B by the physician, the incident and reflected rays being shown by dotted lines.

In the event it is desired to employ opaque picture slides illuminated and visible by projecting light, lamps 110 are provided. These lamps are secured independently to respective light boxes, and are suitably shielded by shades 111 having a rearwardly and downwardly projecting opening directed to the front face of the light box. Each lamp and shade is supported by hollow tubular brackets 112 secured to the top of the light box. Suitable electrical wiring as indicated at 113 passes through these hollow tubes to the sockets 114.

The lens holding mechanism comprises a cross bar 47 secured to the upper end of bracket extension 46 and adapted to slidably support lens frames 121 and 121' for the right and left eyes, respectively. Secured to one of the lens frames as at 122 is a scale 123 readable against an index 124 on the other of said lens frames.

A lead screw 125, having oppositely directed threaded portions 126 and 127 threadably engageable with respective lens frames is supported by the cross bar 47.

A positive and negative scale 128, well known in the optical art, having its zero at the vertical center is provided on the front face of each lens frame. A lens cradle is rotatably mounted within each lens frame and has an index 129. This cradle is adapted to receive lenses in accordance with optical practice. Arranged behind each lens support is a bracket 135 adapted to support square prisms 136 comprising lenses of wedge section. A plurality of arcuate flat springs 140 shown in detail in Fig. 11, are arranged to retain one or more of these wedge lenses in position. The bracket 135 is secured to the lens frame and is adapted to move therewith.

Dividing blinds for the eyes is provided by opaque pliable strips 150, each terminating in a clip 151 at the front thereof which has a hook 152 adapted to engage a loop 153 provided on the member 46. These strips at their rearward ends are rolled up on a spring roller mechanism 152 which is provided with spiral springs 153, one end of each of the springs being secured to the stationary extension 65 and the other end to a vertically arranged post 154 secured to a roller 155 having a slot 156 for the reception of the end of the pliable blind strip 150. The pliable strips or blinds are retained in guideways 157 provided by vertical bars 158 on the inner vertical retaining means 60. By this arrangement the blinds always extend fully across the light boxes and the patient is thus prevented from seeing through between the light boxes. The vision of each eye is restricted to its respective matter associated with each light box.

Figure 5:
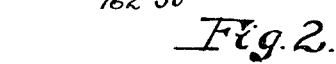
Fig. 5 is a view broken away and partly in section of a stereocampimeter mounting.

Fig. 5 shows, in conventional form, a means for mounting a stereo-campimeter upon the slide 30. The stereo-campimeter frame 160 is provided with a pair of spaced depending pins 162 which are adapted to engage in the holes 30' provided in the slide 30. In this manner, the slide 30 provides a means to support and adjust the stereo-campimeter to permit use of its supported chart 161 in the usual manner. In Fig. 2, the dotted lines 160 indicate the position of the stereo-campimeter on the slide 30.

Fig. 10 shows a wiring diagram of the lamp circuits. The main line 163 divides in two circuits through rheostats 21, 21' and main switches 23, 23' in series respectively with the center contact blade of toggle switches 22, 22'. The two side contacts of each toggle switch are connected to a respective lamp 68 or 110. By this arrangement, the operator may use both front lamp 110 or both rear lamp 68, or he may turn on either lamp 110 or either lamp 68 according to the conditions of any eye test being made. The amount of illumination may be controlled by the rheostats 21, 21'.

Figures 6 to 9 and 12 show, in detail, an adapter frame 165 which is arranged to be slidably received within the front groove 58 shown in Fig. 4. A pair of guides 166 are arranged on this frame within which is adjustably supported a view slide 167. Such slides may take various forms and indicate various subjects. They may be opaque or transparent. A mark 168 on the slide registers with a scale 169 on a guide 166. A rack 170 on each slide is adapted to engage a pinion 171 on a shaft 172 rotatably mounted in bearings 173 on frame 165, which shaft may be rotated by a knob 174.

The adapter slides may be furnished in different sizes, preferably five, numbered from 1 to 5, thereby enabling the doctor to adapt the instrument to more extreme degrees of eye muscle disturbances and, to what extent, pictures may be vertically displaced and the patient may still be able to fuse into one picture.

In a precision stereoscope, the exact separations of the pictures is important in relation to the known separation of the viewing lenses, as well as the viewing distance. If the viewing lenses are set for infinity (their focal length), they would have to be separated from center to center by the same amount as the centers of the stereoscopic pictures in order to render the visual axes of both eyes parallel or, in order to register in normally functioning eyes, a single fused image for distant vision. If, for example, we set the lenses at the 40 mm. point (from midline or 80 mm. lens separation), we would have to likewise set the picture center at 40 mm. fixed rule for this primary or parallel position. The numerals 1, 2, 3, 4 and 5 denote the central positions of correspondingly numbered adapters and are engraved onto the right viewing box just above the upper slide rule as shown in Fig. 3. The #1 adapted is the smallest with its #1 or central marking over 27 mm. fixed rule. The #5 adapter is the largest with its #5 or central marking over 45 mm. fixed rule. In order to make the #1 adapter correspond to the 40 mm. lens marking (80 lens separation), we shift the box outwards until the #1 or central position lies directly above the 40 mm. fixed rule. With a smaller adapter we have a greater range of displacement.

Whereas, one of the important uses of the stereoscope is to determine the ability of the eyes to maintain a single stereoscopic or fused image not only in the primary position but through the approximation or separation of these pictures from the initial position, we must have an accurate means of recording this added or reserve ability of the eyes to maintain fusion other than in the primary position. For this purpose, the employment of fixed and movable rules in relation to an adjustable pointer is the most practical method for making such observations.

If 40 mm. on the fixed rule be selected as the starting point for our operations, we set the pointer over the numeral 40 and, say, the #1 adapter over it, and then shift the upper slide rule with its "0" between the 40 and the #1. In this way, whatever displacements are made in the viewing boxes either internal or external to the primary position for far are indicated by the corresponding shifting or movement of the slide or movable rule in relation to the adjustable pointer which remains fixed over the 40 mm. fixed rule. In terms of eye examination, we may wish to determine the capacity of the eyes to maintain single binocular vision either in the inturning phase (as by shifting the boxes inward) or the turning out phase (as by shifting the boxes outward). We gradually shift the boxes outward until there is a break in the images and then make our reading on the slide rule. We then bring the boxes back to the primary or initial setting and move the boxes inward until there is a break in this internal phase, and again make our reading. Because of the limited range of in-shifting of the boxes as compared to out-shifting, we may have to supplement prisms in the viewing head in order to determine the ability of the eyes to fuse displaced images. In the final analysis, this ability or reserve of the eyes to maintain a single fused image through a calculated displacement of pictures is duly translated into prism diopters by means of suitable tables described in scientific articles published by the inventor.

It is to be emphasized that the 40 mm. setting above was merely arbitrary, and the applicant has formulated tables for any desired setting of lens separations, as well as for any desired lenses of different strengths. It is also to be emphasized that the picture settings are not the same within infinity range as they would be at the focal length of the lenses.

In addition to a vertical adapter, I contemplate a calibrated rotary adapter to determine the ability of the eyes to maintain the fusion of two pictures, either or both of which may be revolved around a measured range to provide additional means of determining the binocular status of the eyes. Fig. 13 shows a rotary adapter 175 wherein the object 176 is mounted in a circular frame having teeth on its periphery which engage a pinion 177 rotated by a knob control 178. A scale 179 on each adapter determines the amount of rotation of the object.

What I claim is:

1. A stereoscope comprising a standard, a pair of spaced support rods pivotally mounted on the upper end of said standard, a slide member mounted on said rods, means for adjusting said member to various positions along said rods, a pair of view boxes secured to said member, means for supporting objects to be viewed on said boxes, an electric lamp within each box for illuminating the objects, a lamp control box secured to the rear ends of said rods and serving to rigidly interconnect said ends, switches operably associated with said control box, conductors connected to said lamps and said switches, a bracket secured to the forward ends of said rods and rigidly interconnecting said forward ends, said bracket extending upwardly above said rods and a pair of viewing lenses mounted on the upper end of said bracket in alignment with said view boxes.

2. A stereoscope comprising a standard, a guide member secured to the upper end of said standard, a carriage slidably supported on said member to be movable between the ends thereof, a pair of view boxes mounted on said carriage, means for moving said boxes towards or away from each other transversely of said member, a bracket rigidly secured to said guide member adjacent one end thereof in front of said view boxes, said bracket being extended vertically to a point in alignment with said boxes, a pair of viewing lenses adjustably secured to the upper end of said bracket, the upper end of said bracket being provided with a rearwardly extending supporting member, an adjustable mirror secured to said supporting member and being positioned above and to the rear of said lenses, whereby the image of the eyes of a patient in position before said lenses may be observed in said mirror by an observer located in rear of the patient.

3. A stereoscope comprising a standard, a guide member secured to the upper end of said standard, a carriage slidably supported on said member to be movable between the ends thereof, a pair of view boxes mounted on said carriage, a bracket rigidly secured to the forward end of said guide member and the free ends of said bracket being extended to points above and below said guide member, a chin rest secured to the lower end of said bracket, a pair of viewing lenses adjustably secured to the upper end of said bracket in alignment with said view boxes, a mirror supported on the upper end of said bracket in rear of and above said lenses, said mirror being adjustably mounted and faced forwardly whereby the image of the eyes of a patient in position before said lenses may be observed in said mirror by an observer located in rear of the patient.

4. A stereoscope comprising a horizontally extending guide member, a slide plate adjustably mounted on said member to be moved therealong, a pair of view boxes adjustably mounted on said slide plate and being movable transversely thereof to positions beyond and at opposite sides of said guide member, a bracket secured to the forward end of the guide member and extending upwardly to a point in alignment with and in front of said view boxes, a reel secured to the rear end of each view box, a flexible septum secured at one end to each reel, a vertically extending guide member mounted on each view box on the inner opposed sides thereof adjacent the forward end of a respective box, each septum being extensible forwardly and over a respective guide member to a point adjacent the bracket, and means to secure both septums to said bracket whereby that portion of each septum between the guide and the reel is movable as a unit with a respective view box.

5. A stereoscope comprising a horizontally extending main support, a slide plate adjustably mounted on said support and movable therealong, a pair of view boxes adjustably mounted on said plate, a bracket secured to said plate, a scale member secured to said bracket and extending transversely to said main support, a second scale member positioned above said first scale member and being secured to and adjacent the lower forward edge of a view box and movable therewith, a third scale member adjustably positioned between and parallel to said first-named scales in frictional contact with said view box, a pair of viewing lenses carried by said main support, means for moving said lenses in unison in opposite directions away from the vertical medial plane of the stereoscope, means for moving said view boxes in unison in opposite directions away from said plane, said first-named scale being numbered from zero upwardly and with the zero line thereof coinciding with said plane, said third scale member being numbered upwardly on either side of a zero mark, said last-named scale being manually movable to position its zero mark opposite to a scale division on the first-named scale corresponding to the lateral displacement of a lens from said plane, said last-named scale being movable towards or away from said medial plane in unison with the view box in contact therewith.

6. A stereoscope comprising a longitudinally extending support, a carriage slidably mounted on said support and movable therealong, a pair of view boxes adjustably mounted on said carriage, means for supporting view objects adjacent the forward ends of said boxes, a vertically extending bracket secured to said support in front of said boxes, a pair of viewing lenses adjustably carried by said bracket whereby said objects may be viewed through said lenses, separate means for moving said boxes and lenses away from or towards the medial vertical plane passing through said support, a fixed scale secured to said carriage at a right angle to said plane, said scale having a zero mark coinciding with said plane and being numbered outwardly from said zero, a second scale secured to a view box above said fixed scale, indicia on said second scale for indicating the middle points of various sizes of view objects supported on said view boxes, a third scale positioned between said other two scales and being supported on said last-named view box to be movable in unison therewith, said third scale having a central zero line and being numbered upwardly on opposite sides thereof.

7. A stereoscope as set forth in claim 6, wherein the bracket for supporting the viewing lenses is provided with a scale for indicating lateral displacement of a lens measured from the medial plane, a vertically extending pointer adjustably supported on the fixed scale and being movable laterally therealong, whereby, preparatory to an eye measurement, said pointer may be set at a point on the fixed scale corresponding to lateral displacement of a lens, said third scale thereafter being manually movable to cause its zero mark to coincide with said pointer, said view box and attached second-named scale being movable to permit the indicia mark thereon for indicating the midpoint of the view object to coincide with said pointer, all lateral movements of the view boxes towards or away from the medial plane thereafter being indicated by movement of the zero of said third-mentioned scale with respect to said pointer.

8. In a stereoscope, a support, a pair of view boxes and a pair of viewing lenses adjustably mounted on said support, means for moving the boxes or the lenses in opposite directions laterally of the medial plane of the support, a scale adjacent said lenses for indicating lateral displacement thereof, means for supporting any one of a series of different size view holding adapters at the front ends of said boxes, an indicating scale secured to one box adjacent the lower edge thereof, said scale being numbered to indicate the midpoint of any adapter positioned thereabove, a fixed scale mounted on the support and positioned with its zero mark coinciding with said medial plane, a third scale mounted on said last-named box and movable therewith whereby movement of said third scale and related box towards or away from said medial plane may be noted by relative movement of said third scale and said fixed scale, said third scale being movable independently of said related box in a manner to set said third scale with reference to the fixed scale to correspond to the lateral displacement of the view lenses from said medial plane.

EMANUEL KRIMSKY.